United States Patent [19]

Taya

[11] Patent Number: 5,013,481
[45] Date of Patent: May 7, 1991

[54] BOILER CHEMICALS AND METHOD OF PREVENTING CORROSION OF BOILERS

[75] Inventor: Shiro Taya, Tokyo, Japan

[73] Assignee: Kurita Water Industries, Ltd., Tokyo, Japan

[21] Appl. No.: 409,328

[22] Filed: Sep. 19, 1989

[30] Foreign Application Priority Data

Sep. 21, 1988 [JP] Japan ................... 63-237373

[51] Int. Cl.$^5$ .............................. C23F 11/10
[52] U.S. Cl. .................. 252/389.23; 422/12; 252/188.28
[58] Field of Search ........... 252/389.22, 389.23, 252/181, 184, 188.28; 422/12

[56] References Cited

U.S. PATENT DOCUMENTS

| | | | |
|---|---|---|---|
| 4,659,482 | 4/1987 | Chen | 252/395 X |
| 4,680,125 | 7/1987 | Cuisia et al. | 252/181 X |
| 4,841,040 | 6/1989 | Gust et al. | 106/213 |

FOREIGN PATENT DOCUMENTS

| | | |
|---|---|---|
| 121567 | 6/1948 | Australia . |
| 447740 | 4/1948 | Canada . |
| 800614 | 12/1968 | Canada . |
| 2017582 | 5/1971 | France . |
| 56-81684 | 5/1979 | Japan . |

OTHER PUBLICATIONS

*Hawley's Condensed Chemical Dictionary*, 11th edition, Van Nostrand Reinhold Co., 1987, p. 1090.
European Search Report.

Primary Examiner—Robert L. Stoll
Assistant Examiner—Valerie Fee
Attorney, Agent, or Firm—Kanesaka and Takeuchi

[57] ABSTRACT

Disclosed is a boiler chemical having both oxygen scavenging function and softening function. The boiler chemical contains a starch phosphate and/or a water-soluble salt thereof. A starch phosphate and/or a water-soluble salt thereof are/is added to the boiler feed water in a given amount of an amount as determined by the phosphate ion concentration in the boiler water and scaled, as measured, whereby the boiler is prevented from being corroded.

7 Claims, 1 Drawing Sheet

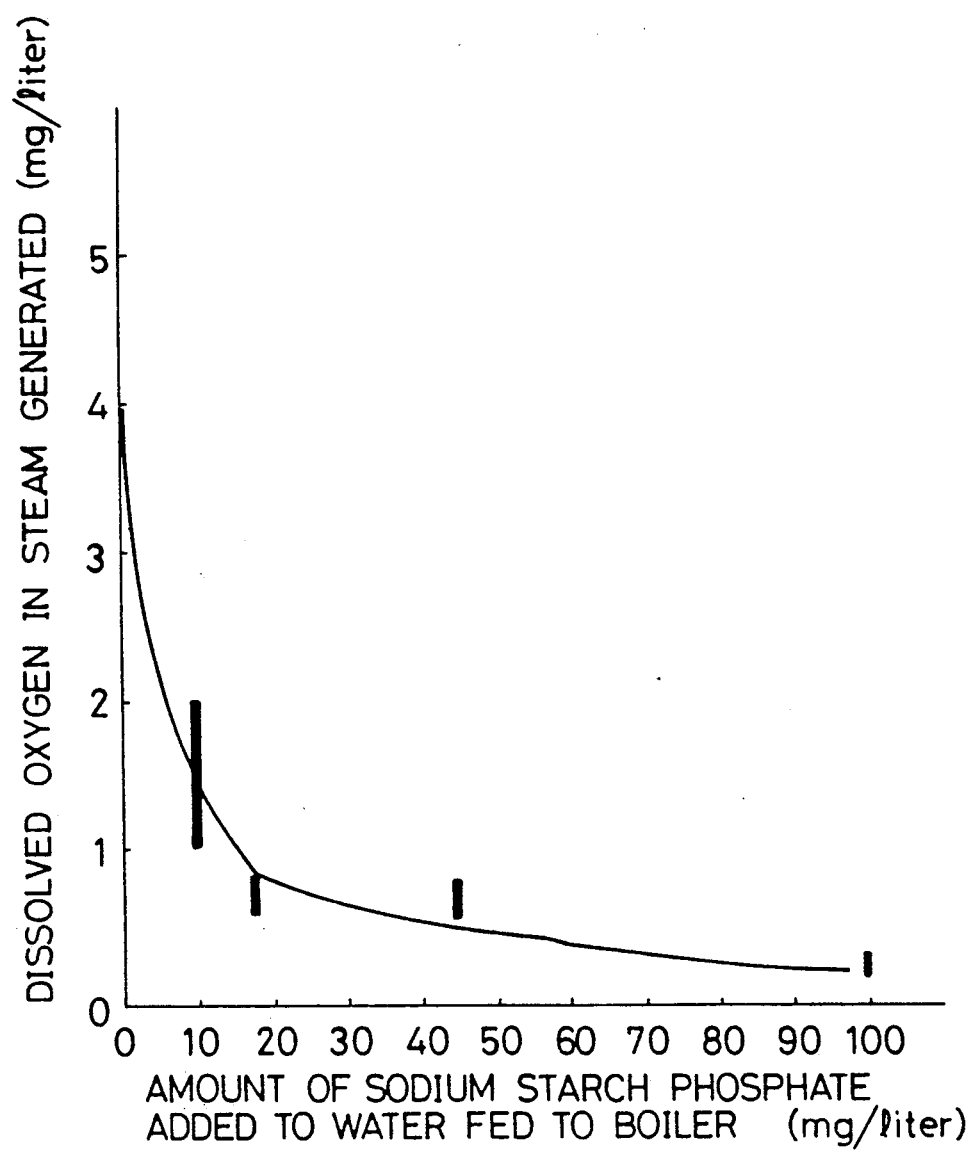

BOILER CHEMICALS AND METHOD OF PREVENTING CORROSION OF BOILERS

FIELD OF THE INVENTION

The present invention relates to a boiler chemical and a method of preventing corrosion of boilers and, in particular, to boiler chemicals which can easily be controlled in respect of the concentration, which are satisfactorily safe and which have two actions of scavenging oxygen and softening (removal of hardness components in water) as well as to a method of preventing corrosion of boilers by the use of the said boiler chemical.

BACKGROUND OF THE INVENTION

For the purpose of preventing corrosion of boilers, a oxygen scavenger is incorporated into a water line to be fed to boilers. Hitherto, hydrazine ($N_2H_4$) or sodium sulfite ($Na_2SO_3$) has widely been used as such an oxygen scavenger. Of the two, $N_2H_4$ may easily be analyzed and can easily be controlled for the concentration, while the safety thereof to human bodies is problematic. Accordingly, use of the compound in hospitals and food factories is refrained from. On the other hand, $Na_2SO_3$ is accepted as an additive to foods here in Japan, and it is utilized as a highly safe oxygen scavenger. However, since the reaction of the compound with oxygen is too rapid, the compound reacts with the dissolved oxygen too rapidly in the dissolution tank to cause lowering of the concentration of the compound in the chemical solution. Accordingly, the compound could not sufficiently remove the oxygen from the water as fed into boiler and therefore corrosion of the inside of boiler could not surely be effected.

As other oxygen scavengers which are free from the drawbacks of the said $N_2H_4$ and $Na_2SO_3$, D-glucose, tannin and lignin have been proposed.

In addition, a boiler compound containing sodium phosphate and sodium hydroxide has also been used for the purpose.

On the other hand, Japanese Patent Application Laid-Open No. 49-30283 has proposed a water-treating agent containing starch phosphate and a water-soluble high polymer substance. Concretely, it illustrates a technique of adding the said water-treating agent to a cooling water line in a determined amount of from 1000 to 2000 ppm as a scale-inhibitor.

With respect to the oxygen scavengers of D-glucose, tannin and lignin, there is unknown a means for detecting the concentration of the said agent in the water fed into a boiler and therefore control of the concentration of the said agent in the water is impossible. Under the situation, where such an oxygen scavenger is used, the dissolved oxygen in the water fed into boiler is analyzed and the amount of the oxygen scavenger to be added is controlled in accordance with the maximum amount of the dissolved oxygen thus analyzed.

However, the amount of the dissolved oxygen in the water fed to boiler noticeably varies every day, depending upon the kind of the feed water to boiler, and such variation is seasonally remarkable. Accordingly, it is extremely difficult to determine the optimum amount of the oxygen scavenger to be added from the result of analysis of the dissolved oxygen. If the amount of the oxygen scavenger added is insufficient, the boiler would be corroded. On the contrary, if it is too much, the excess oxygen scavenger would transfer to the vapor generated so that the vapor would thereby have an peculiar odor. Further, addition of such excess oxygen scavenger would cause elevation of the cost.

As to the liquid boiler compound containing sodium phosphate and sodium hydroxide, since it contains two kinds of sodium salts as the active components in combination, the active components could be blended only in a determined proportion in preparing the compound and the compound could not display a sufficient effect. In addition, the compound has another drawback that the means of handling the compound is complicated.

The water-treating agent containing starch phosphate and a water-soluble high polymer substance, as illustrated in Laid-Open No. 49-30283, is a scale-inhibitor for a cooling water line. Comparing a cooling water line and a boiler water line, the former is operated under far milder conditions for pH and temperature than the latter. Accordingly, the starch phosphate as contained in the agent is not substantially hydrolyzed and the agent does not display an oxygen scavenging effect in the former line. On these grounds, the effect by the hydrolysate from starch phosphate, which will be mentioned hereinafter, could not be obtained in the cooling water line. Laid-Open No. 49-30283 does not suggest the technical idea of removing the dissolved oxygen by the use of the said water-treating agent.

OBJECT AND SUMMARY OF THE INVENTION

The object of the present invention is to overcome the problems in the above-mentioned prior art techniques and to provide a boiler chemical which can easily be controlled in respect of the concentration, which can stably be introduced into the desired water line, which is satisfactorily safe and which has two actions of scavenging oxygen and softening (removal of hardness components like Ca, Mg in the water).

Another object of the present invention is to provide a method of preventing corrosion of boilers by the use of the said boiler chemical, where generation of corrosion and/or scale of the inside of a boiler can effectively and surely be prevented.

The said object has been attained by a boiler chemical characterized by containing a starch phosphate and/or a water-soluble salt thereof. The object has also been attained by a method of preventing corrosion of a boiler which is characterized by adding a starch phosphate and/or a water-soluble salt thereof to a boiler feed water.

The present invention further provides a method of preventing corrosion of a boiler which is characterized in that the phosphoric acid concentration in the boiler water is measured and the amount(s) of the starch phosphate and/or water-soluble salt thereof to be added to the dissolved oxygen-containing boiler feed water is (are) controlled.

The starch phosphate which is one active ingredient in the boiler chemical of the present invention is a compound where phosphoric acid is bonded to the 6-hydroxyl group of the glucose to constitute the starch by ester bond, and it includes a monoester where one glucose is bonded to one phosphoric acid moiety and a diester where two glucoses are crosslinked to sandwich two phosphoric acid moieties therebetween.

As examples of the starch for use in the present invention, there are mentioned natural starches such as corn starch, potato starch, sweet potato starch and tapioca starch and/or processed starches such as esterified starches, oxidized starches and etherified starches.

The starch for use in the present invention may be any of the above-mentioned starches as their crude forms, but it is preferably in the form of a cold water-soluble starch in view of the easy handlability thereof. The cold water-soluble starch can be prepared from the above-mentioned crude starches by acid-decomposition, enzyme-decomposition or oxidative-decomposition method. The cold water-soluble starch has a DE (dextrose equivalent) value of form 1 to 50%, preferably from 2 to 40%.

The starch phosphate for use in the present invention can easily be prepared by blending the above-mentioned starch and phosphoric acid in a determined proportion and reacting them under the condition of a temperature of 0° to 150° C. for a determined period of time. In general, the phosphoric acid concentration in the starch phosphate is from 0.5 to 5% by weight or so.

As examples of water-soluble salts of starch phosphate, there are mentioned salts of the said monoester or diester and an alkali, for example, metal salts such as sodium (Na) salts or potassium (K) salts as well as ammonium ($NH_4$) salts and amine salts. Such water-soluble salts of starch phosphate can easily be prepared by blending a starch phosphate and an alkali compound such as sodium hydroxide, potassium hydroxide, ammonia or monoethanolamine in a pure water at room temperature. In formation of the water-soluble salt of starch phosphate, the starch phosphate and the alkali compound may be blended in any desired proportion.

The boiler chemical of the present invention may contain the said ester, diester or the water-soluble salt thereof, either singly or in combination of two or more of them.

In preparation of the said starch phosphate or a water-soluble salt thereof, non-reacted starting materials would partly remain in the reaction product. As such non-reacted starting materials are useful as components for the boiler chemical, the reaction product containing such non-reacted starting materials can directly be applied to the use of the present invention. Needless to say, the said reaction product may optionally be purified, if desired, before use. For instance, where the concentration of the phosphate ion to be formed by hydrolysis of the starch phosphate or its water-soluble salt in the boiler water is measured and the amount of the starch to be added to the feed water as an oxygen scavenger is determined on the basis of the thus measured value, as mentioned below, it is natural that the reaction product is purified before use for the purpose of reducing the error.

The boiler chemical of the present invention may contain such starch phosphate and/or its water-soluble salt in an amount of from 1 to 100% by weight.

The boiler chemical of the present invention can contain known dispersing agent, oxygen scavenger, hardness components-removing agent (softening agent), pH-adjusting agent such as alkali compounds, and other various additives, if desired. Alternatively, the boiler chemical of the present invention can be employed together with the said chemicals.

As examples, the known dispersing agent includes polycarboxylic acid salts such as low-molecular sodium polyacrylate; the known oxygen scavenger includes sodium sulfite and hydrazine; the known softening agent includes phosphates such as trisodium phosphate and sodium hexametaphosphate; and the known pH-adjusting agent includes sodium hydroxide and ammonia.

In particular, combination of the dispersing agent and the boiler chemical of the present invention is effective, since it brings about an effect of forming a stable suspension of the reaction product from hardness components and phosphoric acid in the boiler water. As a result, the amount to be blown from the boiler system may favorably be reduced noticeably.

Next, the method of preventing corrosion of a boiler by the use of the boiler chemical of the present invention will be explained hereunder.

In accordance with the present invention, the method of preventing corrosion of a boiler is effected by diluting the above-mentioned boiler chemical of the present invention with water, if desired, and then adding the thus-diluted chemical to a boiler feed water thereby to remove oxygen and the hardness components from the boiler water. Addition of the chemical may be effected either intermittently or continuously.

Anyway, where the boiler chemical of the present invention is added to the boiler feed water, the criterion is generally that the amount of the starch phosphate and/or its water-soluble salt to be added is from 5 to 30 mg/liter, to 1 mg/liter of the dissolved oxygen in the boiler feed water. In the case of the present invention, the starch phosphate which is necessary for removing the dissolved oxygen may be added to the boiler feed water whereby the phosphate ion concentration necessary for the action of removing the hardness components from the water is generally sufficiently ensured in view of the quantitative relation between the phosphoric acid moiety and starch moiety of constituting the boiler chemical. The general concentration of the starch phosphate to be added may be from 0.5 to 200 mg/liter as the starch ester and/or its water-soluble salt to the boiler feed water.

Next, another method of preventing corrosion of a boiler by the use of the boiler chemical of the present invention will be explained hereunder. In accordance with the method of preventing corrosion of a boiler previously mentioned, the starch phosphate is added to the boiler feed water in a determined amount on the basis of the amount of the dissolved oxygen in the water. As opposed to this, in accordance with the other method of preventing corrosion of a boiler which will now be mentioned hereunder, the starch phosphate is hydrolyzed in the boiler water to give phosphate ions which may be quantitatively measured, and such property of the starch phosphate is utilized. Specifically, the starch phosphate as added to the boiler feed water transfers to the boiler water and is hydrolyzed therein to give phosphate ions. By measuring the concentration of the phosphate ions thus formed, one may know the concentration of the starch as an oxygen scavenger. Accordingly, the concentration of the dissolved oxygen in the boiler feed water and the phosphate ion concentration in the boiler water are measured, and the starch phosphate and/or its water-soluble salt are/is added to the boiler feed water on the basis of the thus measured values so that the concentration of the starch may be the necessary amount. In accordance with the said method, the boiler chemical of the present invention is added to the boiler feed water only in the necessary amount and therefore, the said method is economically excellent.

The boiler to which the method of the present invention is applied is not specifically limited but the present invention may be applied to any and every boiler for industrial use as well as for domestic use. In particular, as the boiler chemical of the present invention is non-toxic and is highly safe, it may conveniently be used in hospitals and food factories.

The boiler feed water to be applied to the present invention is not also specifically limited, but a soft water or a crude water is suitably employed as the feed water in accordance with the present invention since the boiler chemical of the present invention displays not only an oxygen scavenging effect but also an effect of removing hard components, namely softening.

The starch phosphate and water-soluble salts thereof are food additives and are therefore non-toxic and highly safe. In addition, they are almost odorless.

The starch phosphate or its water-soluble salt is hydrolyzed in a boiler to give starch and a phosphate ion. The starch thus formed acts as an oxygen scavenger to react with the dissolved oxygen in the high temperature boiler water thereby to remove the oxygen from the water. On the other hand, the phosphate ion ($PO_4^{3-}$) as formed by the reaction acts as a softening agent to react with the hard components in the feed water thereby to prevent formation of scales in the boiler because of such hardness component-removing action.

The phosphate ion as formed in the boiler feed water may easily and rapidly be determined by measuring the yellow absorbance of the phosphovanadomolybdate complex to be formed by reaction with ammonium molybdate and ammonium vanadate under an acidic condition. Accordingly, by measuring the phosphate ion concentration, the amount of starch as an oxygen scavenger may thereby easily be controlled.

The starch phosphate and water-soluble salt thereof do not react with the dissolved oxygen when stored in water at a low temperature (room temperature).

Accordingly, in the case of the water-treating agent as illustrated in Laid-Open No. 49-30283, the starch phosphate does not react with the dissolved oxygen to remove the latter. Therefore, no phosphate ion is formed in the use of the said water-treating agent. On these grounds, Laid-Open No. 49-30283 does neither disclose nor suggest the technical idea of controlling the amount of the oxygen scavenging starch by measuring the phosphate ion concentration.

The boiler chemical of the present invention displays both the following two functions:

(1) To remove the oxygen as carried over into the boiler from the boiler feed water and to prevent corrosion of the inside of the boiler (oxygen scavenging).

(2) To prevent formation of scales from the hardness components to be carried over from the boiler feed water (softening).

In addition to said functions, the boiler chemical has additional advantages mentioned below.

(3) The concentration of the chemical may easily be controlled by determination of the phosphate ion concentration so that the concentration of the chemical in the boiler water may be always the optimum value and the chemical may give the excellent result.

(4) The chemical does not react with the dissolved oxygen in the dissolution tank and therefore the concentration of the chemical does not lower. Accordingly, stable introduction of the chemical into the feed water is possible.

(5) The chemical is non-toxic and is highly stable. In addition, it is almost odorless. Therefor it keeps the operational environment good.

On these grounds, the chemical of the present invention is extremely advantageous from the industrial aspect.

In accordance with the method of preventing corrosion of boilers by the use of the boiler chemical of the present invention, which has such excellent functions and advantages, corrosion of boilers and formation of scales in boilers may efficiently be prevented.

BRIEF EXPLANATION OF THE DRAWING

FIG. 1 is a graph to show the experimental result of the oxygen scavenging effect of the sodium starch phosphate obtained in Example 1.

PREFERRED EMBODIMENTS

Next, the present invention will be explained more concretely by way of the following examples.

EXAMPLE 1

A 1/1 mixed water composed of a city water (Atsugi City) having the properties mentioned below and a softened water thereof was fed into a 6-liter steam-generating autoclave at a feeding speed of 13 liters/hr, the pressure being maintained at 10 kg/cm$^2$.

Electroconductivity: 80 μS/cm
pH: 7.6
M Alkalinity: 20 mg as $CaCO_3$/liter
$Cl^-$: 5 mg/liter
$SiO_2$: 13 mg/liter
$SO_4^{2-}$: 11 mg/liter
Dissolved Oxygen: 4 mg/liter
Hardness: 16 mg/liter ($Ca^{2+}$)

In addition, sodium starch phosphate was added to the feed water in an amount of 10 mg/liter, 18 mg/liter, 45 mg/liter or 100 mg/liter, and the boiler water was concentrated 13 times to have pH of 11.1.

After addition, a part of the boiler water was taken out and the phosphate ion ($PO_4^{3-}$) concentration and the calcium ion concentration in the boiler water were measured. At the same time, the steam was sampled from the duct of the steam outlet and the dissolved oxygen in the steam was measured. The conditions in measurement were a temperature of 180° C. and a pressure of 10 kg/cm$^2$.

The results are shown in FIG. 1 and Table 1 below.

TABLE 1

Amount of $PO_4^{3-}$ Generated in Boiler Water and Amount of Hardness Component Removed Therefrom

| No. | Amount of Chemical Added to Feed Water (mg/liter) | Amount of $PO_4^{3-}$ Generated (mg/liter) | Amount of Hardness Component Removed ($Ca^{2+}$, mg/liter) |
| --- | --- | --- | --- |
| 1 | 10 | 4 | 5.7 |
| 2 | 18 | 9 | 12.9 |
| 3 | 45 | 18 | 25.7 |
| 4 | 100 | 40 | 57.2 |

EXAMPLE 2

The same process as in Example 1 was repeated, except that starch phosphate was used in place of sodium starch phosphate, and the oxygen scavenging effect and softening effect were examined. The results are shown in Table 2.

TABLE 2

Amount of $PO_4^{3-}$ Generated in Boiler Water, Amount of Dissolved Oxygen in Steam Generated and Amount of Hardness Component Removed from Boiler Water

| No. | Amount of Chemical Added to Feed Water (mg/liter) | Amount of $PO_4^{3-}$ Generated (mg/liter) | Amount of Dissolved Oxygen in Steam Generated (mg/liter) | Amount of Hardness Component Removed ($Ca^{2+}$, mg/liter) |
| --- | --- | --- | --- | --- |
| 1 | 10 | 4 | 2.6 | 5.7 |
| 2 | 18 | 9 | 1.9 | 12.9 |
| 3 | 45 | 18 | 0.1 or less | 25.7 |
| 4 | 100 | 40 | 0.1 or less | 57.2 |

As is obvious from the results in Table 1, Table 2 and FIG. 1, the boiler chemicals of the present invention displayed excellent oxygen scavenging effect and softening effect. Since there is a constant relation between the phosphate ion concentration in the boiler water and the amount of oxygen removed from the water, the phosphate ion concentration may be controlled in accordance with the amount of the dissolved oxygen in the boiler feed water and a sufficient oxygen-removing effect can therefore be obtained constantly.

EXAMPLE 3

In Examples 1 and 2 where the sodium starch phosphate or starch phosphate was added to the boiler feed water in the given amount, the steam from the boiler was scented by three panelists and was evaluated on the basis of the criteria indicated below. The results obtained are shown in Table 3 below. For comparison, D-glucose was added in the given amount, in place of the boiler chemical of the present invention, and the steam from the boiler was scented and evaluated in the same manner.

Criteria of Evaluation
  O: No smell.
  Δ: Somewhat smelled.
  X: Smelled.

TABLE 3

| No. | Amount Added (to Feed Water) (mg/liter) | Sodium Starch Phosphate | Starch Phosphate | D-glucose |
| --- | --- | --- | --- | --- |
| 1 | 10 | O | O | O |
| 2 | 18 | O | O | Δ |
| 3 | 45 | O | O | Δ to X |
| 4 | 100 | Δ | Δ | X |

From the results in Table 3, it is obvious that the boiler chemicals of the present invention generated almost no smell.

EXAMPLE 4

An aqueous solution containing starch phosphate, sodium starch phosphate or sodium sulfite in an amount of 10% by weight was prepared and stored in an open beaker at 25° C. Immediately, one day, three days or seven days after the preparation, the aqueous solution was added to a 1 liter-beaker filled with a different water, in an amount of 50 mg/liter, and the amount of the dissolved oxygen in the water was measured, whereby the retention of the chemical was obtained.

The results obtained are shown in Table 4 below.

TABLE 4

| Lapse of Time (day) | Starch Phosphate Concentration (wt. %) | Retention (%) | Sodium Starch Concentration (wt. %) | Phosphate Retention (%) | $Na_2SO_3$ Concentration (wt. %) | Retention (%) |
| --- | --- | --- | --- | --- | --- | --- |
| 0 | 10 | 100 | 10 | 100 | 10 | 100 |
| 1 | 10 | 100 | 10 | 100 | 9 | 90 |
| 3 | 10 | 100 | 10 | 100 | 7 | 70 |
| 7 | 10 | 100 | 10 | 100 | 5 | 50 |

As is obvious from Table 4, the amount of the dissolved oxygen in the water did not vary even after 7 days in the case of the boiler chemical of the present invention, and the chemical did not react with the oxygen to be lost during storage. As opposed to this, as sodium sulfite reacts with the oxygen during storage and it is noted that a half of sodium sulfite was thereby lost.

What is claimed is:

1. A method of preventing corrosion of boiler, comprising,
    adding a starch phosphate and/or a water-soluble salt thereof to a boiler feed water, and
    hydrolyzing the starch phosphate and/or water-soluble salt thereof to form starch and phosphate ion in the boiler feed water, said starch reacting with dissolved oxygen to remove oxygen from water as oxygen scavenger and said phosphate ion reacting with hard components of water to prevent formation of scales in the boiler.

2. The method as claimed in claim 1, in which the amount of the starch phosphate and/or water-soluble salt thereof to be added to the boiler feed water is from 0.5 to 200 mg/liter.

3. The method for preventing corrosion of boiler as claimed in claim 1, in which the amount of the starch phosphate and/or water-soluble salt thereof to be added to the boiler feed water is such that the proportion of the starch phosphate and/or water-soluble salt thereof is from 5 to 30 mg/liter to 1 mg/liter of the dissolved oxygen in the boiler feed water.

4. The method of preventing corrosion of boiler as claimed in claim 1, in which at least one selected from the group consisting of a dispersing agent, an oxygen scavenger, a softening agent and a pH-adjusting agent is further added to the boiler feed water.

5. A boiler chemical composition comprising a starch phosphate and/or a water-soluble salt thereof and at least one member selected from the group consisting of a dispersant agent, an oxygen scavenger, a softening agent and a pH-adjusting agent, said starch phosphate and/or water-soluble salt thereof hydrolyzing when added into a boiler water and forming starch and phosphate ion in the boiler water so that said starch removes dissolved oxygen and phosphate ion removes hard components in the boiler water.

6. A method of preventing corrosion of boiler as claimed in claim 1, wherein phosphoric acid concentration in starch phosphate is from 0.5 to 5.0% by weight.

7. A boiler chemical composition as claimed in claim 5, wherein said starch phosphate is formed such that phosphoric acid is bonded to 6-hydroxyl group of glucose to constitute starch by ester bond, and includes monoester where one glucose is bonded to one phosphoric acid moiety and diester where two glucoses are crosslinked to sandwich two phosphoric acid moieties therebetween.

* * * * *